US011190015B2

(12) United States Patent
Marsh-Croft et al.

(10) Patent No.: US 11,190,015 B2
(45) Date of Patent: Nov. 30, 2021

(54) CONTROL OF HEATING ELEMENTS

(71) Applicant: BREVILLE PTY LIMITED, Alexandria (AU)

(72) Inventors: Ashley Marsh-Croft, Woollahra (AU); Tibor Hegedis, Rosebery (AU); Brendan John Foxlee, Earlwood (AU); Emma Craig, Ultimo (AU); Lichan Meng, Randwick (AU)

(73) Assignee: BREVILLE PTY LIMITED, Alexandria (AU)

( * ) Notice: Subject to any disclaimer, the term of this patent is extended or adjusted under 35 U.S.C. 154(b) by 436 days.

(21) Appl. No.: 15/561,929

(22) PCT Filed: Mar. 29, 2016

(86) PCT No.: PCT/AU2016/000109

§ 371 (c)(1),
(2) Date: Sep. 26, 2017

(87) PCT Pub. No.: WO2016/154661

PCT Pub. Date: Oct. 6, 2016

(65) Prior Publication Data

US 2018/0115161 A1 Apr. 26, 2018

(30) Foreign Application Priority Data

Mar. 30, 2015 (AU) ................................ 2015901141

(51) Int. Cl.
*H02J 3/14* (2006.01)
*H02M 5/257* (2006.01)
(Continued)

(52) U.S. Cl.
CPC ............. *H02J 3/14* (2013.01); *H02M 5/2573* (2013.01); *H05B 1/0202* (2013.01);
(Continued)

(58) Field of Classification Search
CPC .. H02J 3/14; H02J 2003/002; H02J 2003/143; H02M 5/2573; H02M 2005/2937; H05B 1/0202
(Continued)

(56) References Cited

U.S. PATENT DOCUMENTS 5,754,036 A * 5/1998 Walker ...................... G05F 1/66 323/235
6,246,034 B1 6/2001 Glaser et al.
(Continued)

FOREIGN PATENT DOCUMENTS

CN 1307398 A 8/2001
CN 103957636 A 7/2014
(Continued)

OTHER PUBLICATIONS

Office Action issued in Chinese Patent Application No. 201680020260.2, dated May 7, 2019.

(Continued)

*Primary Examiner* — Hal Kaplan
*Assistant Examiner* — Swarna N Chowdhuri
(74) *Attorney, Agent, or Firm* — Marshall, Gerstein & Borun LLP

(57) ABSTRACT

An apparatus for controlling one or more switched high power loads (or heating elements). The apparatus including: one or more switched high power loads (or heating elements), each high power load being powered from a common alternating current power source, and wherein each load is independently switched using a switching signal for zero crossing switching to achieve a desired average power output; the switching signal is generated that comprises a repeated switching sequence; the switching sequence indi-
(Continued)

cates a respective selecting activation for each of the switched high power load over a sequence of half or full cycles.

21 Claims, 11 Drawing Sheets

(51) Int. Cl.
*H05B 1/02* (2006.01)
*H02J 3/00* (2006.01)
*H02M 5/293* (2006.01)

(52) U.S. Cl.
CPC ............ *H05B 1/0261* (2013.01); *H02J 3/002* (2020.01); *H02J 2310/14* (2020.01); *H02M 5/2937* (2021.05)

(58) Field of Classification Search
USPC ............................................................ 307/38
See application file for complete search history.

(56) References Cited

U.S. PATENT DOCUMENTS 6,404,171 B2 6/2002 Saida
6,700,333 B1 * 3/2004 Hirshi .................. H05B 47/185 315/291
7,016,115 B1 * 3/2006 Leeb .................. H04B 10/1149 359/298
8,338,983 B2 * 12/2012 Rozman .................... H02P 1/58 307/29
2003/0030386 A1 * 2/2003 Leeb .................. H04B 10/1143 315/291
2004/0208022 A1 10/2004 Gibson
2004/0217108 A1 * 11/2004 Levy .................. H05K 7/20209 219/507
2007/0178728 A1 * 8/2007 Barrena ................. H01H 19/62 439/108
2009/0294434 A1 * 12/2009 Fonseca ............... H05B 1/0263 219/498
2011/0153246 A1 * 6/2011 Donaldson ............... G01D 4/00 702/65
2011/0198926 A1 * 8/2011 Xu .......................... H02M 1/44 307/38
2014/0077718 A1 * 3/2014 Zotter .................... H05B 47/16 315/224
2016/0042901 A1 * 2/2016 Oosterwal ............. H01H 50/86 361/186

FOREIGN PATENT DOCUMENTS

DE 4108406 A1 9/1992
EP 0740223 A2 10/1996
GB 2095927 A * 10/1982 ............ H02M 1/082
JP H0980961 A 3/1997
RU 1809516 A1 4/1993
RU 2010136955 A 4/2012
RU 2012109542 A 9/2013
SU 1100693 A1 6/1984

OTHER PUBLICATIONS

Office Action issued in Russian Patent Application No. 2017135102, dated Sep. 13, 2019.

International Search Report for PCT/AU2016/000109, dated May 19, 2016.

Extended European Search Report for European Patent Application No. 16771082.1, dated Sep. 25, 2018.

Examination Report for Australian Patent Application No. 2016/240388, dated Apr. 11, 2018.

* cited by examiner

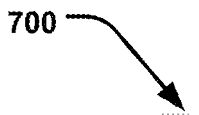

| Power Level | Heater arrangement | Power (W) | 1/2 periods | | | | | | | | | | Repeating pattern frequency | Flicker frequency (line draw disruption) | Time between longest change |
|---|---|---|---|---|---|---|---|---|---|---|---|---|---|---|---|
| | | | 0.5 | 1 | 1.5 | 2 | 2.5 | 3 | 3.5 | 4 | 4.5 | 5 | | | |
| 710 level 1 | Top heater | 0 | off | off | | | | | | | | | N/A | 0 | N/A |
| | Bottom heater | 0 | off | off | | | | | | | | | | | |
| | Flicker | | | | | | | | | | | | | | |
| | regulation | 0 | 0 | 0 | | | | | | | | | | | |
| 720 level 2 | Top heater | 721 90 | off | off | on | off | off | off | off | off | off | off | 12Hz | 24Hz | 41.67ms |
| | Bottom heater | 722 90 | off | off | off | off | off | off | off | on | off | off | | | |
| | Flicker | | | | | | | | | | | | | | |
| | regulation | 723 00100 | 0 | 0 | 1 | 0 | 0 | 0 | 0 | 1 | 0 | 0 | | | |
| 730 level 3 | Top heater | 731 112.5 | off | off | off | on | off | off | off | off | | | 15Hz | 30Hz | 33.33ms |
| | Bottom heater | 732 112.5 | off | off | off | off | off | off | off | on | | | | | |
| | Flicker | | | | | | | | | | | | | | |
| | regulation | 733 0001 | 0 | 0 | 0 | 1 | 0 | 0 | 0 | 1 | | | | | |
| level 4 | Top heater | 150 | off | on | off | off | off | off | | | | | 20Hz | 40Hz | 25ms |
| | Bottom heater | 150 | off | off | off | off | on | off | | | | | | | |
| | Flicker | | | | | | | | | | | | | | |
| | regulation | 010 | 0 | 1 | 0 | 0 | 1 | 0 | | | | | | | |
| level 5 | Top heater | 180 | off | on | off | off | off | | | | | | 24Hz | 24Hz | 41.67ms |
| | Bottom heater | 180 | off | off | off | on | off | | | | | | | | |
| | Flicker | | | | | | | | | | | | | | |
| | regulation | 01010 | 0 | 1 | 0 | 1 | 0 | | | | | | | | |
| level 6 | Top heater | 225 | off | on | off | off | | | | | | | 30Hz | 60Hz | 16.67ms |
| | Bottom heater | 225 | off | off | off | on | | | | | | | | | |
| | Flicker | | | | | | | | | | | | | | |
| | regulation | 01 | 0 | 1 | 0 | 1 | | | | | | | | | |
| level 7 | Top heater | 270 | on | off | off | off | on | off | off | on | off | off | 12Hz | 24Hz | 41.67ms |
| | Bottom heater | 270 | off | off | on | off | off | on | off | off | off | on | | | |
| | Flicker | | | | | | | | | | | | | | |
| | regulation | 10101 | 1 | 0 | 1 | 0 | 1 | 1 | 0 | 1 | 0 | 1 | | | |

740 → Level 9; 741, 742, 743 → Top heater, Bottom heater and regulation values of Level 9

750 → Level 10; 751, 752, 753 → Top heater, Bottom heater and regulation values of Level 10

| | | | | | | | | | | | | | |
|---|---|---|---|---|---|---|---|---|---|---|---|---|---|
| Level 8 | Top heater | 300 | on | off | off | on | off | off | | | 20Hz | 40Hz | 25ms |
| | Bottom heater | 300 | off | off | on | off | off | on | | | | | |
| | Flicker | | | | | | | | | | | | |
| | regulation | 101 | 1 | 0 | 1 | 1 | 0 | 1 | | | | | |
| Level 9 | Top heater | 337 | off | on | off | on | off | off | on | off | 15Hz | 30Hz | 33.33ms |
| | Bottom heater | 337 | off | off | on | off | off | on | off | on | | | |
| | Flicker | | | | | | | | | | | | |
| | regulation | 0111 | 0 | 1 | 1 | 1 | 0 | 1 | 1 | 1 | | | |
| Level 10 | Top heater | 360 | on | off | on | off | off | | | | 24Hz | 24Hz | 41.67ms |
| | Bottom heater | 360 | off | off | on | off | on | | | | | | |
| | Flicker | | | | | | | | | | | | |
| | regulation | 10201 | 1 | 0 | 2 | 0 | 1 | | | | | | |
| Level 11 | Top heater | 450 | on | off | | | | | | | 60Hz | 120Hz | 8.33ms |
| | Bottom heater | 450 | off | on | | | | | | | | | |
| | Flicker | | | | | | | | | | | | |
| | regulation | 1 | 1 | 1 | | | | | | | | | |
| Level 12 | Top heater | 540 | on | off | on | off | on | | | | 24Hz | 24Hz | 41.67ms |
| | Bottom heater | 540 | on | off | on | off | on | | | | | | |
| | Flicker | | | | | | | | | | | | |
| | regulation | 20202 | 2 | 0 | 2 | 0 | 2 | | | | | | |
| Level 13 | Top heater | 562.5 | on | off | on | on | off | on | off | on | 15Hz | 30Hz | 33.33ms |
| | Bottom heater | 562.5 | off | on | off | on | on | off | on | on | | | |
| | Flicker | | | | | | | | | | | | |
| | regulation | 1112 | 1 | 1 | 1 | 2 | 1 | 1 | 1 | 2 | | | |
| Level 14 | Top heater | 600 | on | on | off | | | | | | 40Hz | 40Hz | 25ms |
| | Bottom heater | 600 | off | on | on | | | | | | | | |
| | Flicker | | | | | | | | | | | | |
| | regulation | 121 | 1 | 2 | 1 | | | | | | | | |

| Level | | | | | | | | | | | | | | | |
|---|---|---|---|---|---|---|---|---|---|---|---|---|---|---|---|
| Level 15 | Top heater | 630 | on | on | off | on | on | on | off | on | off | on | 12Hz | 24Hz | 41.67ms |
| | Botton heater | 630 | on | off | on | off | on | on | on | off | on | on | | | |
| | Flicker | | | | | | | | | | | | | | |
| | regulation | 21112 | 2 | 1 | 1 | 1 | 2 | 2 | 1 | 1 | 1 | 2 | | | |
| Level 16 | Top heater | 675 | on | on | off | on | | | | | | | 30Hz | 60Hz | 16.67ms |
| | Botton heater | 675 | off | on | on | on | | | | | | | | | |
| | Flicker | | | | | | | | | | | | | | |
| | regulation | 12 | 1 | 2 | 1 | 2 | | | | | | | | | |
| Level 17 | Top heater | 720 | on | on | on | off | on | | | | | | 24Hz | 24Hz | 41.67ms |
| | Botton heater | 720 | on | off | on | on | on | | | | | | | | |
| | Flicker | | | | | | | | | | | | | | |
| | regulation | 21212 | 2 | 1 | 2 | 1 | 2 | | | | | | | | |
| Level 18 | Top heater | 750 | on | on | on | on | off | on | | | | | 20Hz | 40Hz | 25ms |
| | Botton heater | 750 | on | off | on | on | on | on | | | | | | | |
| | Flicker | | | | | | | | | | | | | | |
| | regulation | 212 | 2 | 1 | 2 | 2 | 1 | 2 | | | | | | | |
| Level 19 | Top heater | 787.5 | on | on | on | on | off | on | on | on | | | 15Hz | 30Hz | 33.33ms |
| | Botton heater | 787.5 | off | on | on | on | on | on | on | on | | | | | |
| | Flicker | | | | | | | | | | | | | | |
| | regulation | 1222 | 1 | 2 | 2 | 2 | 1 | 2 | 2 | 2 | | | | | |
| Level 20 | Top heater | 810 | on | on | on | on | on | on | on | off | on | on | 12Hz | 24Hz | 41.67ms |
| | Botton heater | 810 | on | on | off | on | on | on | on | on | on | on | | | |
| | Flicker | | | | | | | | | | | | | | |
| | regulation | 22122 | 2 | 2 | 1 | 2 | 2 | 2 | 2 | 1 | 2 | 2 | | | |
| Level 21 | Top heater | 900 | on | on | | | | | | | | | 120Hz | 120Hz | 8.33ms |
| | Botton heater | 900 | on | on | | | | | | | | | | | |
| | Flicker | | | | | | | | | | | | | | |
| | regulation | 2 | 2 | 2 | | | | | | | | | | | |

| Cooking Function | Heater arrangement | Power (W) | 1/2 periods 0.5 | 1 | 1.5 | 2 | 2.5 | 3 | 3.5 | 4 | 4.5 | 5 | Repeating pattern frequency | Flicker frequency (line draw disruption) | Time between longest change |
|---|---|---|---|---|---|---|---|---|---|---|---|---|---|---|---|
| 811 Bake / Pizza / Reheat BEFORE | Top heater | 812 700 | on | on | on | on | on | on | on | off | off | | 13.3Hz | 13.3Hz | 75ms |
| | Bottom heater | 813 800 | on | on | on | on | on | on | on | on | off | | | | |
| | flicker regulation | 814 222222210 | 2 | 2 | 2 | 2 | 2 | 2 | 2 | 1 | 0 | | | | |
| 815 Bake / Pizza / Reheat AFTER | Top heater | 816 700 | on | on | off | on | on | on | on | on | off | | 13.3Hz | 40Hz | 25ms |
| | Bottom heater | 817 800 | on | on | on | on | on | off | on | on | on | | | | |
| | flicker regulation | 818 221 | 2 | 2 | 1 | 2 | 2 | 1 | 2 | 2 | 1 | | | | |
| 821 Broil Low BEFORE | Top heater | 822 500 | on | on | on | on | on | on | off | off | off | | 13.3Hz | 13.3Hz | 75ms |
| | Bottom heater | N/A | N/A | N/A | N/A | N/A | N/A | N/A | N/A | N/A | N/A | | | | |
| | flicker regulation | 824 111111000 | 1 | 1 | 1 | 1 | 1 | 1 | 0 | 0 | 0 | | | | |
| 825 Broil Low AFTER | Top heater | 826 500 | on | on | off | | | | | | | | 40Hz | 40Hz | 25ms |
| | Bottom heater | N/A | N/A | N/A | N/A | | | | | | | | | | |
| | flicker regulation | 828 110 | 1 | 1 | 0 | | | | | | | | | | |

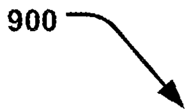

| Cooking Function | Heater arrangement | | Power (W) | 1/2 periods | | | | | | | | | | Repeating pattern frequency | Flicker frequency (line draw disruption) | Time between longest change |
|---|---|---|---|---|---|---|---|---|---|---|---|---|---|---|---|---|
| | | | | 0.5 | 1 | 1.5 | 2 | 2.5 | 3 | 3.5 | 4 | 4.5 | 5 | | | |
| Broil Medium BEFORE | Top heater | 912 | 700 | on | on | on | on | on | on | on | off | off | | 33.3Hz | | 75ms |
| | Bottom heater | 913 | N/A | N/A | N/A | N/A | N/A | N/A | N/A | N/A | N/A | N/A | | | | |
| | flicker | | | | | | | | | | | | | | | |
| | regulation | 914 | 111111100 | 1 | 1 | 1 | 1 | 1 | 1 | 1 | 0 | 0 | | | | |
| Broil Medium AFTER | Top heater | 916 | 700 | on | on | on | on | off | on | on | on | off | | 33.3Hz | | 41.67ms |
| | Bottom heater | 917 | N/A | N/A | N/A | N/A | N/A | N/A | N/A | N/A | N/A | N/A | | | | |
| | flicker | | | | | | | | | | | | | | | |
| | regulation | 918 | 111101110 | 1 | 1 | 1 | 1 | 0 | 1 | 1 | 1 | 0 | | | | |
| Roast BEFORE | Top heater | 922 | 630 | on | on | on | on | on | on | on | off | off | off | 12Hz | | 83.33ms |
| | Bottom heater | 923 | 900 | on | on | on | on | on | on | on | on | on | on | | | |
| | flicker | | | | | | | | | | | | | | | |
| | regulation | 924 | 2222222111 | 2 | 2 | 2 | 2 | 2 | 2 | 2 | 1 | 1 | 1 | | | |
| Roast AFTER | Top heater | 926 | 630 | on | on | off | on | on | off | on | on | on | off | 12Hz | | 33.33ms |
| | Bottom heater | | 900 | on | on | on | on | on | on | on | on | on | on | | | |
| | flicker | | | | | | | | | | | | | | | |
| | regulation | 928 | 2232232232 | 2 | 2 | 3 | 2 | 2 | 3 | 2 | 2 | 3 | 2 | | | |

FIG. 9

CONTROL OF HEATING ELEMENTS

FIELD OF THE INVENTION

The present invention relates to switching high power electrical loads and in particular to controlled switching of switching high power electrical loads for reducing voltage/current fluctuation in the associated power mains that can cause visible/observable flickering of lights.

The invention has been developed primarily for use as apparatus and method of controlling one or more heating elements of a kitchen appliance and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

To operate an oven (such as a compact oven) with different power profiles for reaching a set temperature, a dimming circuit can be used to control the oven's heating elements to reach the required temperature. This type of dimming requires an EMC (electromagnetic compatibility) filter circuit so that the dimming circuit does not cause electromagnetic interference affecting mains power and appliances on the same electric circuit. The type of EMC solutions required can be costly.

Another way of providing different power profiles is to switch the heating elements on and off for varying times. Kitchen appliances that switch heating elements to control power or temperature have been observed to cause a visible "flicker" in lights located within the device or connected on the same mains power circuit.

It is understood that the flicker in the light results from fluctuation in the voltage supply, being a consequence of power line switching, which causes the light to change intensity at a frequency that can be observed.

OBJECT OF THE INVENTION

It is an object of the present invention to overcome or ameliorate at least one of the disadvantages of the prior art, or to provide a useful alternative.

Described herein are a method and apparatus for switching high power electrical loads in a form that reduces voltage/current fluctuation in the associated power mains that cause visible/observable flickering of lights.

SUMMARY OF THE INVENTION

According to an aspect of the technology there is provided an apparatus including: one or more switched high power loads (or heating elements), each high power load being powered from a common alternating current power source, and wherein each load is independently switched using a switching signal for zero crossing switching to achieve a desired average power output;

the switching signal is generated from repeating (or comprises a repeated) a switching sequence;

the switching sequence indicating activation (either connection or isolation) of each respective high power load from the power source over a sequence of half or full cycles; and wherein the combined magnitude switching sequence for each respective high power load comprises frequency components not less than 24 Hz.

In an alternative embodiment, frequency components may lie below 24 Hz, but more energy is present in the frequency components that lie above 24 Hz than in any frequency components that lie below 24 Hz.

In an embodiment, using 60 Hz mains power supply, a summed sequence formed by adding each active switching signal used in controlling activation repeats in 5 or less half cycles of the mains power (or 3 full cycles).

In an embodiment, using 50 Hz mains power supply, a summed sequence formed by adding each active switching signal used in controlling activation repeats in 4 or less half cycles of the mains power (or 2 full cycles).

In an embodiment, the switching sequence may be retrieved from a lookup table.

In an embodiment, the switching signal may achieve different power levels for each load. Different activation (proportions of connection to isolation) from the mains power source is provided for each respective high power load.

In an embodiment, a temperature control module may use switch control or power level control (e.g. PID). In power level control, a different switching sequence may be used to achieve a different power output for controlling temperature.

According to an aspect of the technology there is provided a processor apparatus adapted to generate one or more switching signal for controlling operation of a respective one or more switched high power loads (or heating elements), each high power load being powered from a common alternating current power source, and wherein each load is independently switched using the switching signal for zero crossing switching to achieve a desired average power output; wherein the switching sequence being indicative of activation (either connection or isolation) of each respective high power load from the power source over a sequence of half or full cycles; and wherein the combined magnitude switching sequence for each respective high power load comprises frequency components not less than 24 Hz.

According to an aspect of the technology there is provided a method of generating one or more switching signals that controls operation of a respective one or more switched high power loads (or heating elements) in a processor (or computer) system, said method comprising the steps as herein disclosed; wherein each load is independently switched using the switching signal for zero crossing switching to achieve a desired average power output; wherein the switching sequence being indicative of activation (either connection or isolation) of each respective high power load from the power source over a sequence of half or full cycles; and wherein the combined magnitude switching sequence for each respective high power load comprises frequency components not less than 24 Hz.

BRIEF DESCRIPTION OF THE DRAWINGS

A preferred embodiment of the invention will now be described, by way of example only, with reference to the accompanying drawings in which:

FIG. 7A-7C is a table showing example control switching signals for controlling two loads according to an aspect of the technology;

FIG. 8 is a table showing example control switching signals for controlling two loads according to an aspect of the technology; and FIG. 9 is a table showing example control switching signals for controlling two loads according to an aspect of the technology.

DETAILED DESCRIPTION

It will be appreciated that kitchen countertop appliances (for example, toaster ovens) can operate on electrical circuits used by other appliances and lights. The appliance can have one or more high power switched loads (for example, heating elements), and can produce a respective switching signal to control power supplied to each load.

Factors that have been identified as affecting flicker of lights that are observable (or visible) to a human include:

(a) the sum of all artefacts caused by each respectively actively switched loads cause combined artefacts to be introduced to (or present on) the mains power source or circuit; and (b) the artefacts introduced to (or present on) the mains power source or circuit can cause variation in light intensity that occur at a frequency that can be observed; and (c) a person cannot typically perceives visual events occurring at greater than 24 Hz.

By controlling zero crossing switching of high power loads, such that resulting frequency components of the signal are greater than 24 Hz, flicker observed on light connected to the same power source or circuit can be eliminated or reduced. By controlling zero crossing switching of multiple high power loads, such that frequency components of the combined switching signal lie above 24 Hz, more switching options (average power setting) are available for each load while still eliminating or reducing any observable flicker on light connected to the same power source or circuit.

Avoiding frequency components below 24 Hz, reduces or eliminates artefacts introduced to (or overlayed on) the power source or circuit having a frequency component less than 24 Hz—thereby a person would not observe flickering of lights connected (either internally or externally) to a related power circuit.

The switching signals produced can comprise a repeated switching sequence or segment. The switching sequence or segment may be calculated or generated. The switching sequence or segment may be obtained from a predetermined look up table. The switching signals perform, or are associated with, zero crossing switching during any heating period. Using zero crossing switching (as opposed to, for example, conventional dimming methods) reduces high frequency harmonic components that would require costly EMC filter circuits.

It will be appreciated that a combined switching sequence or segment that repeats in five or less half periods for a 60 Hz AC power source (four or less half periods for a 50 Hz AC power source) maintains all frequency components at or above 24 Hz.

It will be appreciated that it is also possible to modulate the switching signal so that the load is switched on or off for full cycles, and not half cycles. However, half cycle control results in a higher resolution and more flexibility in switching combinations.

Figure 1:
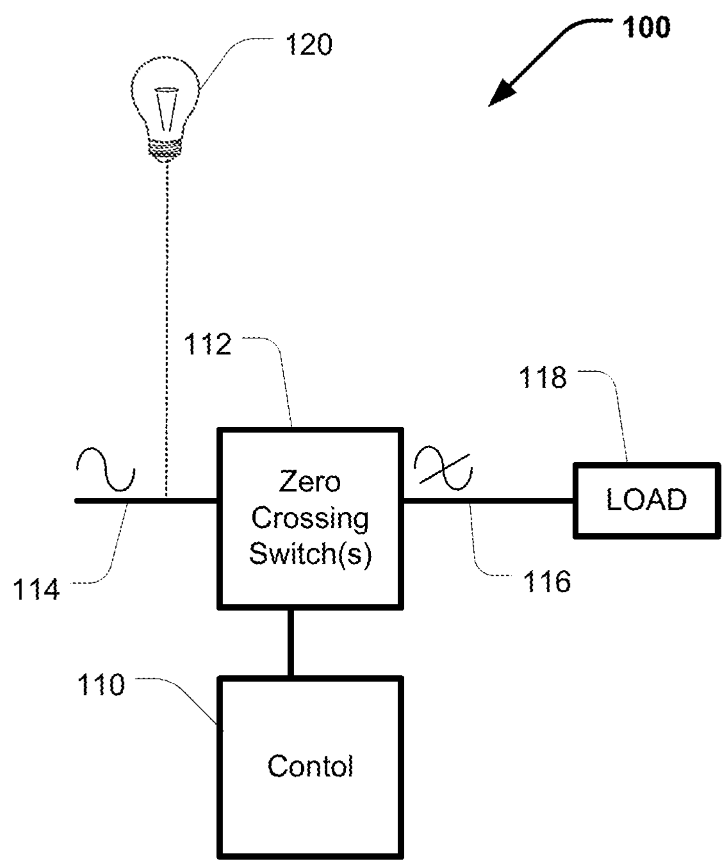
FIG. 1 is an embodiment apparatus for controlling power to a load according to the present technology.

FIG. 1 shows a load control system 100 that uses a control module 110 that controls a zero crossing circuit or switch 112 that selectively switches each half waveform of an input AC power source 114 to provide a controlled supply waveform 116 to a load 118.

It will be appreciated that a zero crossing circuit or switch is an electrical circuit that operates with the input AC power source at phases close to a zero degrees or 180 degrees, thereby enabling each half cycle of the AC waveform to be selectively passed to or restricted from the load.

A zero crossing circuit or switch typically uses a solid state relay, such as a triode for alternating current (TRIAC) and/or silicone controlled rectifiers (SCR). The purpose of the circuit is to start conducting while the voltage is crossing zero volts, such that the output voltage is in complete sine-wave half-cycles. Zero crossing switching reduces any high frequency harmonic components in the output waveform.

The present invention can operate with any zero-crossing circuit or switch. Many zero-crossing circuits are known in the art.

It has been observed that a light (for example 120) when coupled to the input power source or circuit 114 can exhibit flickering or other visual artefacts caused by current or voltage fluctuations on the source power circuit caused by selective or repetitive switching of a high power load connected to the same power circuit.

It is an aspect of the present technology to eliminate or reduce any signal artefacts that may cause a light source coupled to the input power circuit to present an observable flicker.

Figure 2:
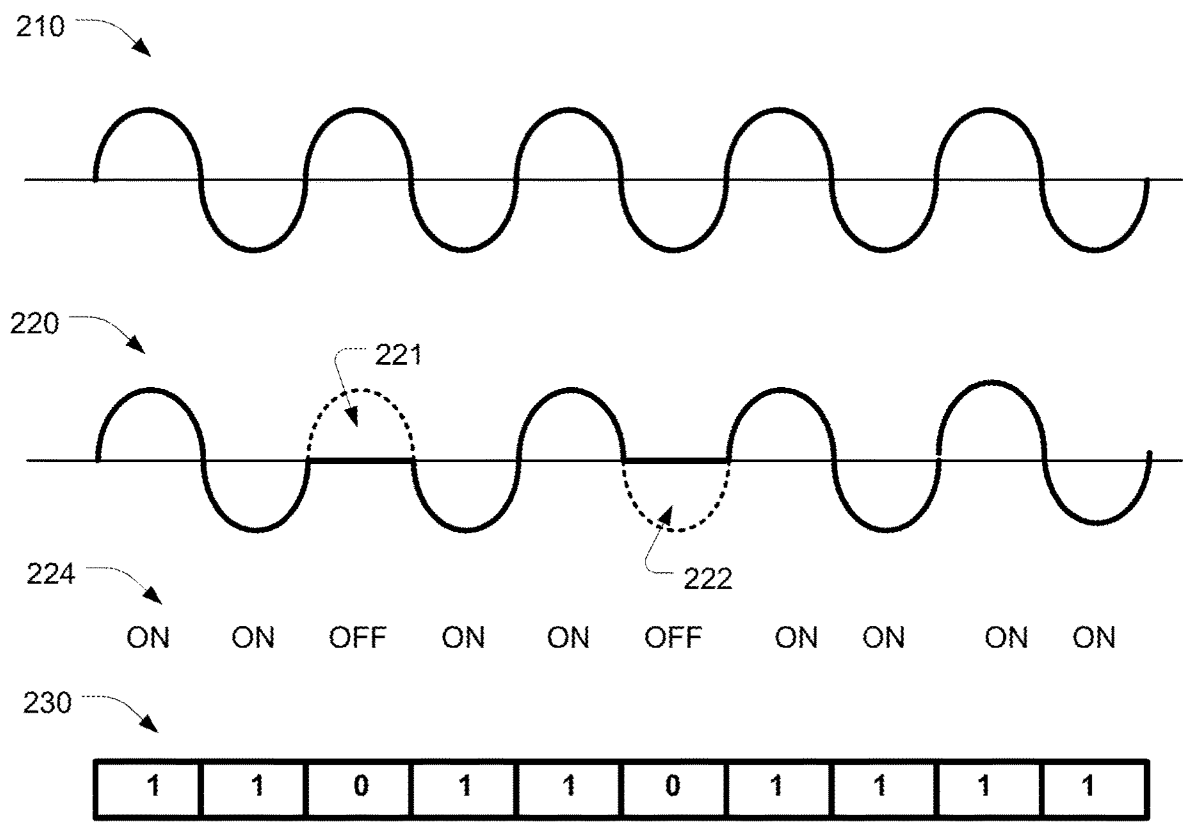
FIG. 2 is a graph showing example control switching signals for the apparatus of FIG. 1.

FIG. 2 shows graphs indicative of example signals used in controlling power supplied to a load.

In this example, an input waveform 210 is a typical AC waveform. Domestic power in many countries is either 110 volts or 240 volts operating at a frequency of 50 Hz or 60 Hz. By controlling the power supplied to e.g. heating elements in a compact oven, the operation of the appliance can be controlled, for example for providing different heat profiles.

The switched AC waveform 220 shows, by way of example only, the selective removal of sine-wave half-cycles (at 221 and 222). The switch waveform for controlling the selection of sine-wave of half-cycles can be represented as the sequence 230.

Each switching control signal in the switching sequence 230 accords with a half period of the power line sinusoidal signal. For example, if the AC waveform is 60 Hz, the switch period of the switching sequence is 8.33 milliseconds. For a 50 Hz source AC waveform, the half-cycle switching waveform would have a switch period of 10 milliseconds.

For a switching sequence associated with a 50 Hz AC waveform, a switching sequence repeated every four half-cycle periods would repeat at a rate of 25 Hz.

For a switching sequence associated with a 60 Hz AC waveform, a switching sequence repeated every five half-cycle periods would repeat at a rate of 24 Hz.

It is further understood that a person cannot typically perceive visual events occurring at greater than 24 Hz. In the time domain, this means that any switching (or any changes on the power line that could cause a change in the brightness of lights connected to the power line) that happen faster than approximately 41 ms, are unlikely to be perceived by the human eye. Referring to a 50 Hz power line, this means that changes (e.g. switching on, or switching off) in intervals that are longer than 4 half-cycles means that switching occurs slower than every 41 ms, at a frequency below 25 Hz, and may therefore be perceived by the human eye. With lights, this could result in a flickering that can be very disturbing.

Figure 3:
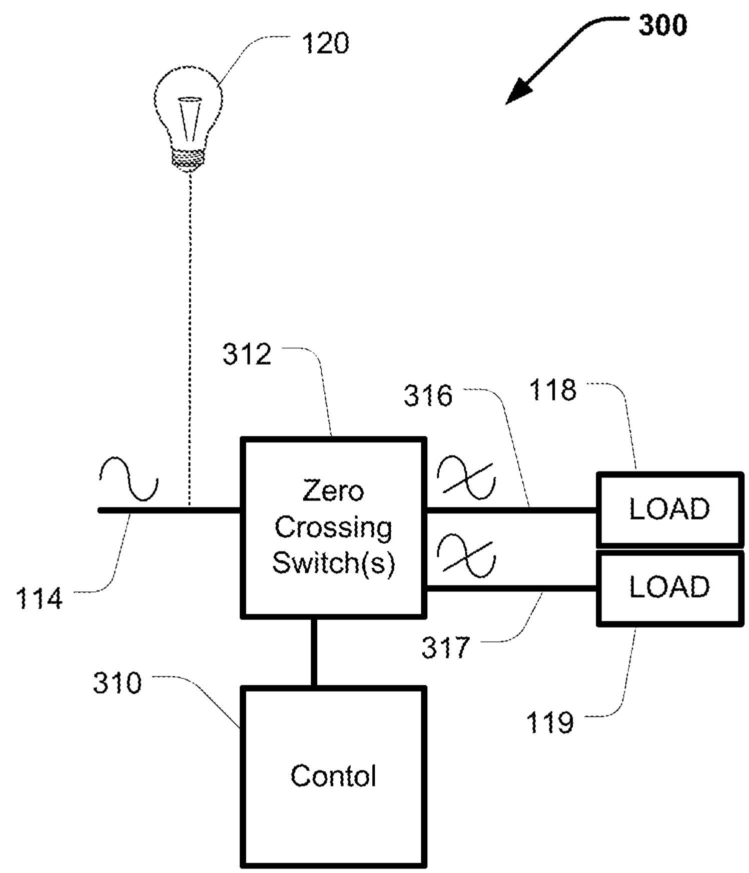
FIG. 3 is an embodiment apparatus for controlling power to two loads according to the present technology.

FIG. 3 shows a load control system 300 that uses a control module 310 that controls a zero crossing circuit or switch 312 that selectively switches each half waveform of an input AC power source 114 to provide a controlled supply waveforms 316, 317 to respective loads 118, 119.

It will be appreciated that each of the switched loads have a common AC waveform source 114, and half-cycles are selectively and separately switched for each load.

As discussed with reference to FIG. 4, the control module 310 provides separate switching signals for each of the separate loads. This system can be extended to provide control for a plurality of loads.

Figure 4:
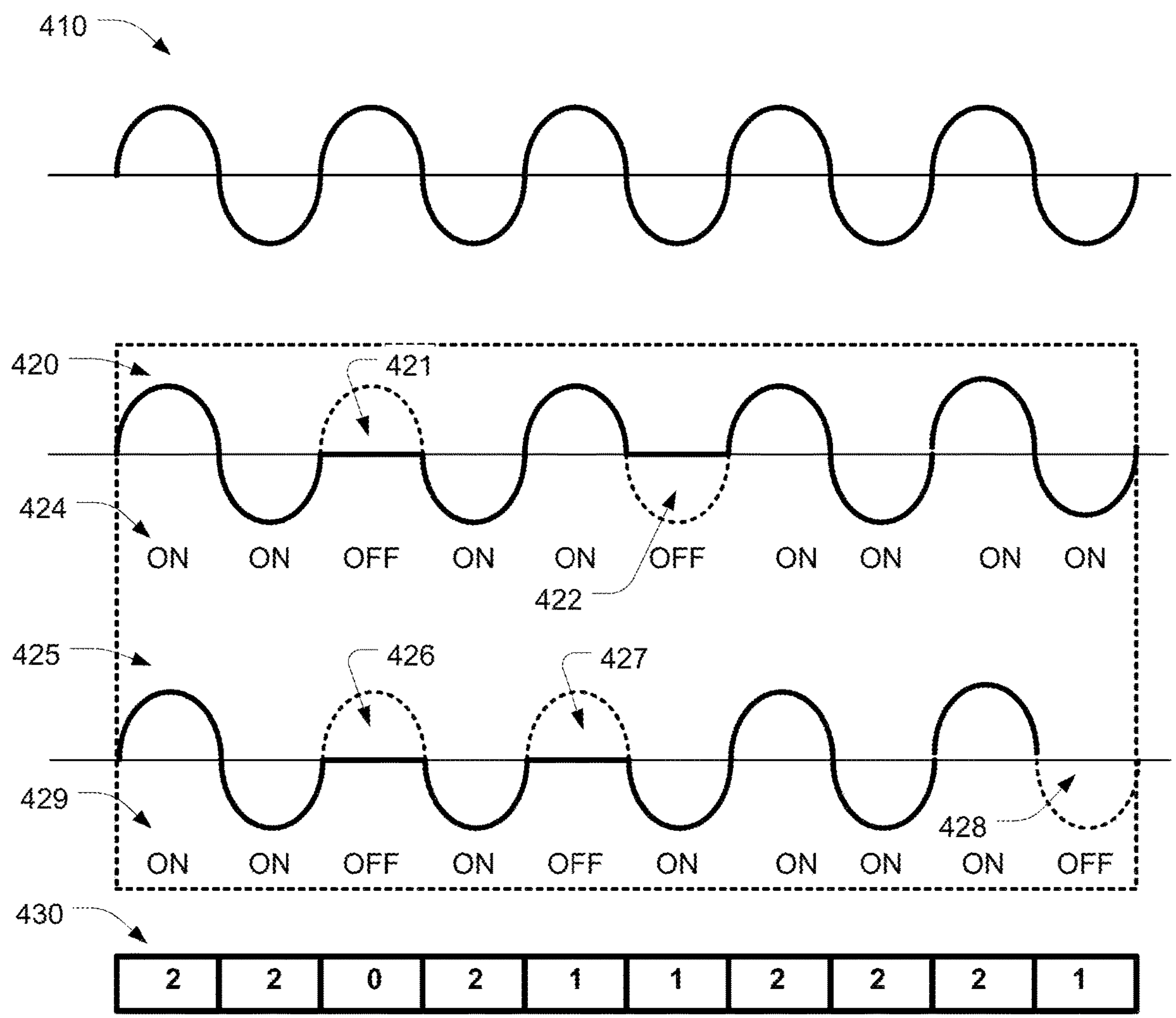
FIG. 4 is a graph showing example control switching signals for the apparatus of FIG. 3.

FIG. 4 shows graphs indicative of example signals used in separately controlling power supplied to two loads.

In this example, an input waveform 410 is a typical AC waveform and is selectively switched for each of the separate loads, for example as shown at 420 (for load 118), and at 425 (for load 119). The first load 118 is selectively switched to remove half-cycles at 421 and 422. The second load 119 waveform 425 is selectively switched to remove half-cycles at 426, 427 and 428.

It will be appreciated that the effective load applied to the power source or circuit, due to the combination of the modulated control signals simultaneously applied to the two loads, can be represented or indicated by the sequence 430. This waveform represents the number of loads connected at each half-cycle, being either two loads or one load or no loads. Independent switching sequences for each of the separate loads are represented at 424 and 429. It has been shown that any changes in load (e.g. from 0 to 1, from 1 to 2, from 0 to 2, or vice versa) contribute to flickering of light(s) 120 connected to the same power source. If these changes occur at a frequency above 24 or 25 Hz (in other words, changes in power requirements occur faster than 41 ms apart), then the resulting flickering is not perceivable.

It will be appreciated that the relative power consumed by the load (or equivalently radiated by a heating element), is proportional to the number of half-cycles provided to the load—assuming similarity in the power drawn by each load when active. Having a control switching sequence that repeats over 10 half-cycles, it is possible to provide zero to 100 percent power in increments of 10 percent. If repeating the control cycle every 8 half-cycles, it is possible to provide power between zero and 100% with incremental steps of about 12.5 percent.

The present technology relates to how the control signals can be modulated to enable a relative power to be controlled for each load, while keeping the majority of the power in frequency components above 24 Hz. Alternatively, the separate switching sequences are configured such that all frequency components of the resulting combined switching waveform less than 24 Hz have low power, thereby avoiding or reducing perceivable visual artefacts resulting from a flickering light connected to the power source circuit.

The current technology is particularly relevant to switching of high powered loads, such as high powered resistive heating elements, because high power loads result in current and/or voltage changes on the power line. In such embodiments, it is also typically necessary to control a temperature provided by the heating elements. It will be appreciated that feedback control of temperature can be implemented using any conventional or known feedback methods including, but not limited to, On-Off Control, Proportional Control, Proportional-Derivative Control, Proportional-Integral Control, Proportional-Integral-Derivative Control (PID control), and Third-Order Control Systems.

It will be appreciated that temperature control can be further incorporated in a number of alternate embodiments. By way of example only, embodiments that incorporate temperature control are shown in FIG. 5A, FIG. 5B and FIG. 6.

Figure 5A:
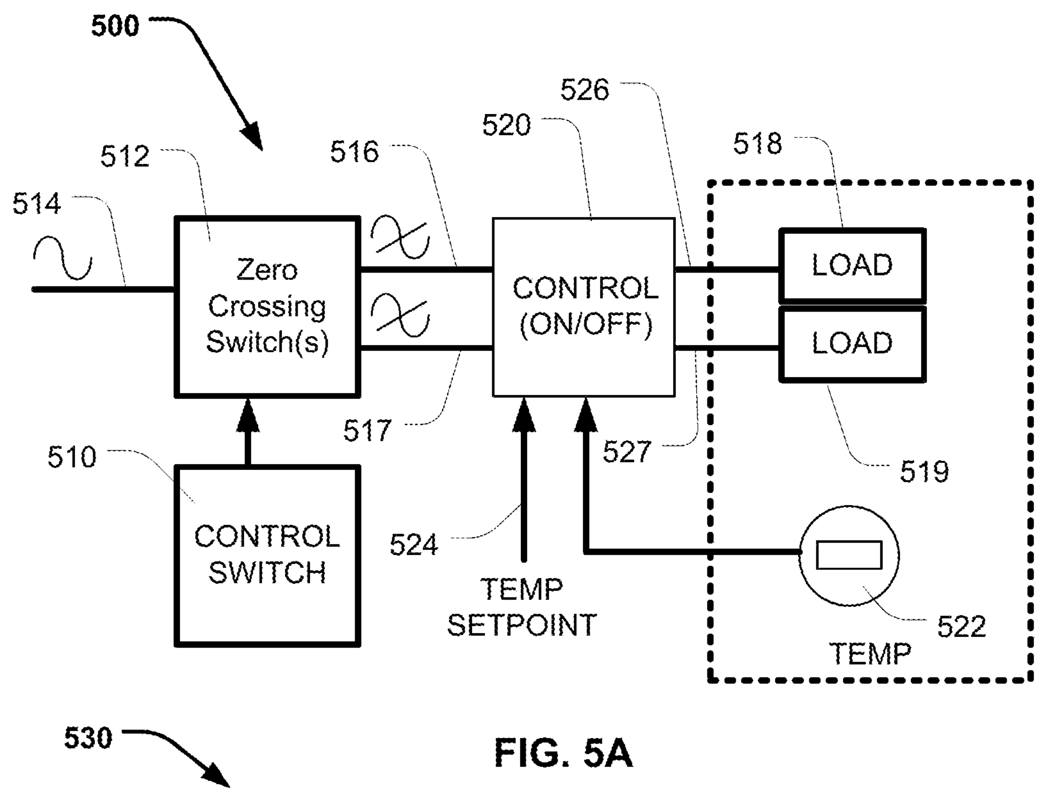
FIG. 5A is an embodiment apparatus for controlling power to two loads according to the present technology, showing incorporating a feedback temperature control.
Figure 5B:
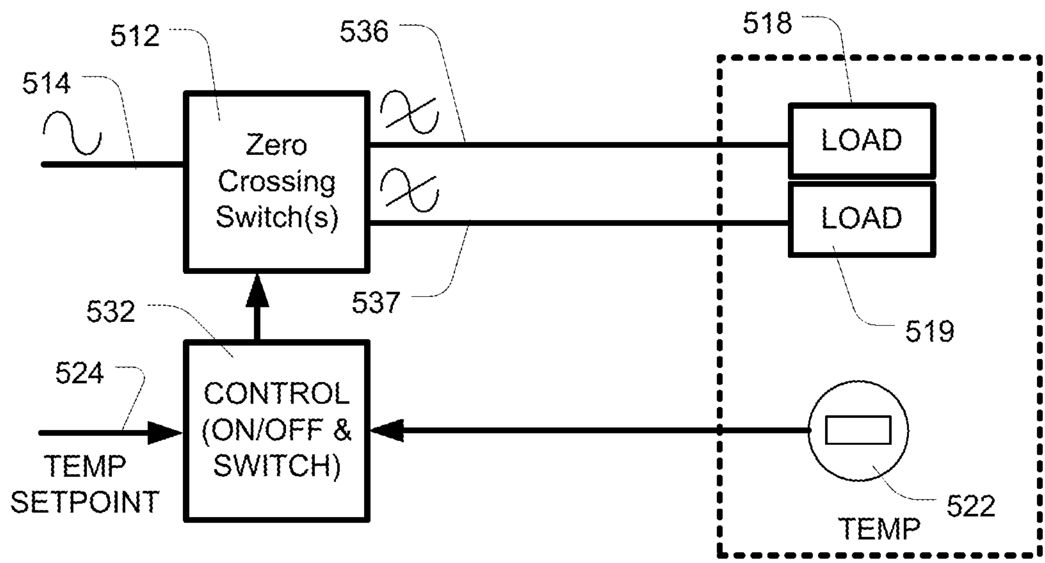
FIG. 5B is an embodiment apparatus for controlling power to two loads according to the present technology, showing incorporating a feedback temperature control.
Figure 6:
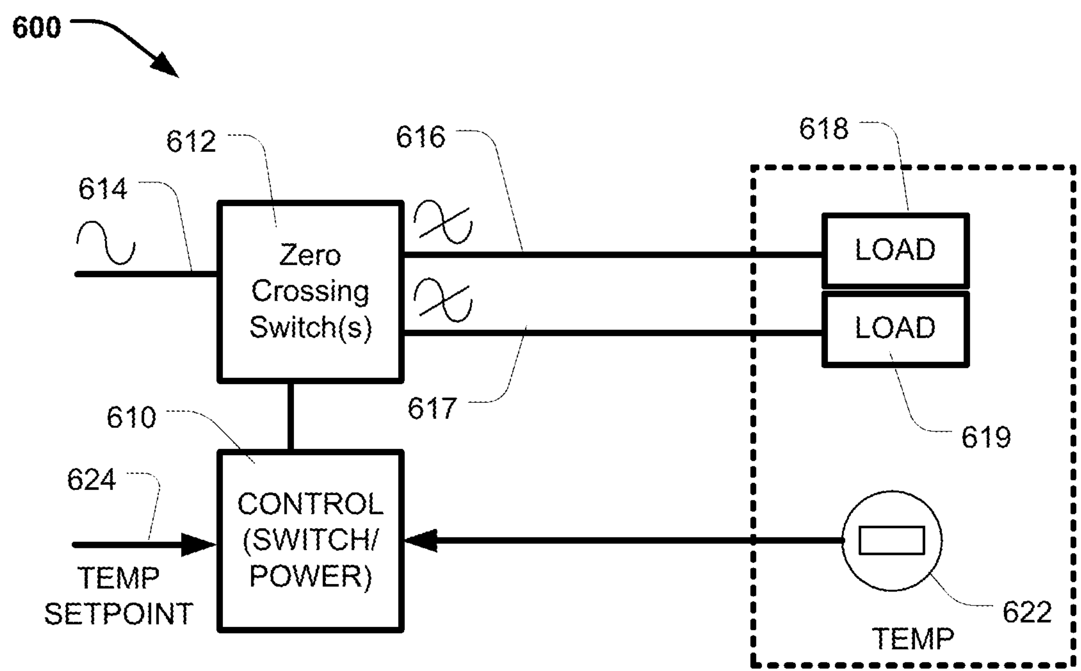
FIG. 6 is an embodiment apparatus for controlling power to two loads according to the present technology, showing incorporating a feedback temperature control.

FIG. 5A shows an embodiment 500 that incorporates a conventional on/off temperature feedback controller, in which power is selectively applied to the load based on a measured temperature signal.

The embodiment 500 comprises a control module 510 that controls a zero crossing circuit or switch 512 that selectively switches each half waveform of an input AC power source 514 to provide controlled supply waveforms 516, 517 to respective loads 518, 519.

It will be appreciated that a zero crossing circuit or switch is an electrical circuit that operates with the input AC power source at phases close to a zero degrees or 180 degrees, thereby enabling each half cycle of the AC waveform to be separately selectively passed to or restricted from the respective loads. The control module 510 causes separate switching signals to be generated for each of the separate loads. This system can be extended to provide control for a plurality of loads.

Temperature control can be inserted by including an on/off control module 520 that is configured to connect or separate the loads from the respective zero crossing switched waveforms 516,517. In this example, power is typically applied to the load when the temperature sensor 522 provides a signal indicative of the current temperature being below a set point 524. The controller 520 selectively passes the switched signals 516,517 as a temperature controlled switched signals 526,527 based on a temperature feedback control.

It will be appreciated that, while the on/off controller selectively provides power to the loads, the input power is determined by the zero crossing switch and switch controller as described herein. Accordingly, when the on/off controller provides power, the switched power waveform is determined by the power control circuitry, which can apply a relative power supplied to each of the loads through selective removal of half-cycles.

It will be appreciated that the on/off control can further include hysteresis to avoid rapid activation or deactivation of the on/off control.

FIG. 5B shows a further embodiment 530, in which the switching controller 532 further receives a temperature signal from a temperature sensor 522 and a temperature set point 524, which controls the zero crossing switch to either provide a pre-determined power signal sequence to respective loads, or to disable power to each of the loads using an on/off control based on a temperature feedback controller.

It will be appreciated that the on/off control can further include hysteresis to avoid rapid activation or deactivation of the on/off control.

FIG. 6 shows an alternative embodiment 600, wherein the control module provides more sophisticated temperature feedback control, by selecting switching signals to provide one of a plurality of power levels to the separate loads, using a separate switching signal for each load.

In this example, the temperature control can be maintained using more sophisticated feedback control, in which temperature feedback signal provided by a temperature sensor 622 is assessed according to a temperature set point to vary a selected power to each of the loads. It will be appreciated that each load can be separately controlled.

The power is controlled to the loads using a switching signal that is used by the zero crossing switch 612 to selectively supply half-cycles of the source waveform 614. It will be appreciated that: the more half-cycles provided to a load, the power to the load (or heater) and/or heat radiated from the load increases; while reducing the number of half-cycles provided to the load (or heater), the power to the load and/or heat radiated from the load decreases.

Conventional or known feedback methods suitable for use with apparatus 600 include, but are not limited to, Proportional Control, Proportional-Derivative Control, Proportional-Integral Control, Proportional-Integral-Derivative Control (PID control), and Third-Order Control Systems.

FIG. 7A through FIG. 7C disclose a plurality of switching sequences 700 for a pair of heating modules or elements, which enable the power supplied to the load to be varied. These sequences are adapted for use with the apparatus 600.

In this example embodiment 700, the heating modules or elements are described as a top heater and a bottom heater, and the overall power provided to each heater in each power setting, is symmetric.

The table defines twenty-one distinct power levels between no power provided to each heating element and full power provided to each heating element. A combined switching sequence is also represented for each power level.

In each of these embodiments, the switching sequences are defined with reference to a 60 Hz AC power source, and each switching period corresponds to a half-cycle of the AC source power waveform.

Each of the twenty-one example power level settings of FIG. 7A through FIG. 7C have been selected so that, when repeated to provide continuous switching of the heating modules or elements, any one of these combinations will result in frequency components of at least 24 Hz. As each of the heating modules or elements are connected to a single source power circuit, the overall load on this power circuit is represented by the total switching sequence, and any artefacts imposed on a light connected to this power circuit are caused by the changes in total load applied to the circuit.

Referring to power level '1' (at 710), the switching signals represents zero power being applied to the heating elements, in which both heating elements are continuously off.

Referring to power level 2 (at 720), the switching signals represents each of the heating modules or elements being selectively turned on for one in ten half-cycles of the source power waveform (i.e. 10% power). Individually, the switching waveform of either heating module or element (at 721,722) includes a frequency component at 12 Hz (i.e. repeating over ten half-cycles of the source waveform). By arranging the switching sequences for the separate heating elements or modules by staggering the two switching patterns with respect to one another, a total switching sequence (at 723) can be configured such that, when repeated, the signal comprises frequency components of 24 Hz or above (i.e. the total switching signal repeating every five half-cycles of the source waveform). In this example, the repetition in the total switching waveform is represented by "0,0,1,0,0" as shown at 723.

Referring to power level 3 (at 730), the switching signals represent each of the heating modules or elements being selectively turned on for one in eight half-cycles of the source power waveform (i.e. 12.5% power). Individually, the switching waveform of either heating module or element (at 731,732) includes a frequency component of 15 Hz (i.e. repeating over eight half-cycles of the source waveform). By arranging the switching sequences for the separate heating elements or modules by staggering the on/off half-cycles with respect to one another, a total switching sequence (at 733) can be configured such that, when repeated, the signal comprises frequency components of 30 Hz (i.e. the total switching signal repeating every four half-cycles of the source waveform). In this example, the repetition in the total switching waveform is represented by "0,0,0,1" as shown at 733.

Referring to power level 9 (at 740), the switching signals represent each of the heating modules or elements being selectively turned on for three in eight half-cycles of the source power waveform (i.e. 37.5% power). Individually, the switching waveform of either heating module or element (at 741,742) comprises frequency components at 15 Hz (i.e. repeating over eight half-cycles of the source waveform). By arranging the switching sequences for the separate heating elements or modules by staggering them with respect to one another, a total switching sequence (at 743) can be configured such that, when repeated, the signal comprises frequency components at 30 Hz (i.e. the total switching signal repeating every four half-cycles of the source waveform). In this example, the repetition in the total switching waveform is represented by "0,1,1,1" as shown at 743.

Referring to power level 10 at (750), the switching signals represent each of the heating modules or elements being selectively turned on for two in five half-cycles of the source power waveform (i.e. 40% power). Individually, the switching waveform of either heating module or element (at 751,752) includes a frequency component at 24 Hz (i.e. repeating over five half-cycles of the source waveform). In this example, the switching sequences for the separate heating elements or modules can be combined such that the total switching sequence (at 753), when repeated, also includes frequency components at 24 Hz (i.e. the total switching signal repeating every five half-cycles of the source waveform). In this example, the repetition in the total switching waveform is represented by "1,0,2,0,1" as shown at 753.

It will be appreciated that in power level 10 (at 750), the total switching sequence for each heater element or module is repeated each 5-half-cycles of the source power waveform, thereby resulting in frequency components at 24 Hz. Accordingly, the combined switching sequence is also defined by a sequence of five consecutive half-cycles of the source power waveform, thereby (when repeated) resulting in frequency components at 24 Hz.

It would be appreciated that, for a 60 Hz AC power source waveform, by selectively arranging the switching sequence of two or more heating modules or elements (for example over ten half-cycles), such that the total switching sequence (or signal) repeats with a period of no more than five half-cycles by staggering the switching sequences with respect to one another, the resulting frequency components may be kept above 24 Hz, or frequency components below 24 Hz can be reduced/minimised.

Similarly, it would be further appreciated that, for a 50 Hz AC power source waveform, by selectively arranging the switching sequence of two or more heating modules, such that the total switching sequence (or signal) repeats with a period of no more than four half-cycles, the resulting frequency components can be kept above 25 Hz.

It would also be appreciated that the individual switching sequences (for each of the loads) can be longer than that shown in FIG. 7A through FIG. 7C, and include frequency components of less than the desired 24 Hz, provided the total switching sequence when repeated has a period of repetition so that the frequency components of the combined switching are above 24 Hz. By maintaining the switching frequency components associated with the total load above 24 Hz, artefacts applied to the source power circuit are such that any observable effect on lighting connected to that circuit is eliminated or reduced. Examples of this can be seen at level 2 and level 20, where each individual load switches on or off once every 10 half cycles (causing 12 Hz, perceivable changes), but when combined and staggered, the total load on the power line switches at a 24 Hz frequency (or, in other words, changes to the load occur at least every 41 ms).

In each of the examples described in FIG. 7A through FIG. 7C, equal average power is applied to each heating module or element. It would be appreciated that the individual switching sequences for the separate heating modules or elements can be varied to provide asymmetric power to each of the heating modules or elements, while maintaining a repetition period of the total switching sequence resulting in frequency components above 24 Hz.

The range of power levels defined by FIG. 7A through FIG. 7C may further be used in a feedback control method for maintaining temperature. The controller selects an appropriate power, or modifies the power provided to the load, to maintain the desired temperature set point. While the general concept of temperature control via feedback is known in the art, the controller, in this example, uses specific switching sequences to provide the controlled power to the separate loads (as best described with reference to FIG. 6).

It will be appreciated that the predetermined switching sequences can also be derived or calculated or determined for providing asymmetric power to separate loads, while still providing a range of power levels suitable for use in a feedback control loop.

By way of example, it may be appropriate to have a top heating element operating at a lower power setting than the bottom heating element, for example when making pizza. The ratio between the top heating module or element and bottom heating module or element can be maintained across multiple power levels for use in variable power temperature feedback controller.

Alternatively, a switching sequence for maintaining the relative powers between the separate heating/load modules or elements can be determined and then controlled using a typical on/off feedback control (typically with some hysteresis as shown by way of example with reference to FIG. 5A and FIG. 56).

FIG. 8 shows two example modes of operating a plurality of load (or heater) modules (or elements) in which the average power provided to the separate modules are different.

A single sequence is defined for the respective ratio of power levels, this sequence can be used with a conventional ON/OFF temperature feedback control circuit.

To reduce flickering of lights on the same power line, it is desired that frequency components resulting from the switching of these loads lie above 24 Hz, or that any frequency component less than 24 Hz is minimised.

FIG. 8 shows example switching sequences (at 815, 825) in which the separate heater/load modules or elements are operated at different power levels. These example embodiments have a source AC power waveform of 60 Hz.

In the first example (at 810) an appliance (for example a toaster or oven) has two heater modules or elements that are separately controlled to provide about 78% power and 89% power respectively. Using a conventional switching sequence (at 811), wherein the first load module is provided power for the first seven of nine half-cycles of a source AC power waveform (then repeated) and the second load module is powered for the first eight of nine half-cycles (then repeated), the resulting frequency components for each signal is about 13.3 Hz. It would be appreciated that the combined switching sequence (at 814) also has a resulting frequency component of about 13.3 Hz (corresponding to a period of nine half-cycles of the AC source power waveform). By reconfiguring (at 815) the switching sequence of the separate load modules (at 816, 817) to distribute the half-cycles that the respective module is not powered, it is possible to create a combined switching sequence (at 818) over the nine half-cycles that repeat each 3 half-cycles. It will be appreciated that, when the switching sequence (at 818) is repeated, there is a repetition every three half-cycles (at 819), thereby resulting in a frequency component of 40 Hz.

A second mode of operating an apparatus having two load modules is shown (at 820). In this example, the first heater load module is operated for six of nine half cycles (66% power), while the second load module is deactivated. It would be appreciated that a switching sequence (at 822) that comprises operating a load module for six consecutive half-cycles and then deactivating the load module for three further half-cycles has a repeat period of 9 half-cycles, and therefore a frequency component at 13.3 Hz. As the total switching sequence (at 824) corresponds to that of the first heater/load module or element, it too has a frequency of 13.3 Hz. By reconfiguring the switching sequences (at 825), the same average power can be provided to the load module with a switching sequence (at 826) having a repeat period of three half-cycles. Accordingly, the total switching sequence (at 828), when repeated, has a repeat period of three half-cycles and a resulting frequency component of 40 Hz. The total switching sequence is again the same as the load module and has a frequency component of 40 Hz.

The calculations made in regard to FIG. 8 are based on an AC source power waveform having a frequency of 60 Hz. It will be appreciated that, in each example disclosed in FIG. 8, if operated using an AC source power waveform of 50 Hz, the repeat period of 3 half-cycles would result in a frequency component of about 33.3 Hz.

FIG. 9 shows two example modes of operating of a plurality of load (or heater) modules (or elements) in which the average power provided to the separate modules are different.

A single sequence is defined for the respective ratio of power levels, this sequence can be used with a conventional ON/OFF temperature feedback control circuit.

As before, it is desired that any frequency components resulting from the switching of these loads lie below 24 Hz are minimised.

FIG. 9 shows example switching sequences (at 915, 925) in which the separate heater/load modules or elements are operated at different power levels. These example embodiments have a source AC power waveform of 60 Hz.

In these examples, it will be appreciated that the switched signal includes frequency components below 24 Hz. However, by modulating the switching sequences differently, this low frequency component below 24 Hz can be reduced or eliminated.

In a conventional mode of operating the apparatus (at 911) it is desired that a first load module is operated at about 78% power (at 912), while the second load module is disabled (at 913). By having a switching sequence (at 912) that is on for the first 7 half-cycles and then deactivated for the next 2 half-cycles, the switching sequence (when repeated) has a repeat period of 9 half-cycles—resulting in a frequency component of about 13.3 Hz. By redistributing (at 915) the ON/OFF half-cycles in the switched sequence (at 916), it is possible to provide a signal with frequency components above 24 Hz.

Referring to a further mode of operating a plurality of load modules (at 920), a first load module is operated at 70% power, while a second load module is operated at 100% power. In a conventional switching sequence (at 921) a first load module can be activated for seven consecutive half-cycles and then deactivated for a further three consecutive half-cycles (at 922). In this example, the switching sequence for the second load module is always ON over each half-cycle (at 923). Accordingly, the frequency components of the switching sequence for the top heater element and the total switching sequence (at 924) are directly related. In this conventional example, the top load module switching sequence (and therefore the total switching sequence) when repeated has a repeat period of ten half-cycles and includes a frequency component at 12 Hz. By redistributing (at 925) the ON/OFF half-cycles in the switching sequence (at 926), it is possible to provide a signal with stronger frequency components at or above 24 Hz. While the total switching signal (at 928), when repeated, has a repeat period of ten half-cycles, the frequency component at 12 Hz may be reduced or removed, when compared to the previous example (at 924).

By reducing the power in frequency components that lie below 24 Hz, artefacts on the source power circuit (resulting from power drawn when high loads are switched on/off) are reduced, thereby causing observable flickering in a light on that circuit to also be reduced or eliminated.

For the example shown at 928, the on/off cycles do not occur regularly with the same interval. Instead, the pattern is "2,2,1,2,2,1,2,2,2,1", so that switching occurs over 3 half-cycles, then over 3 half-cycles, and then over 4 half-cycles. This set of 3 switching groups is then repeated. Consequently, for each switching group the speed of switching is (for 60 Hz) every 25 ms for a group of 3 half-cycles, and every 33 ms for a group of 4 half-cycles. Therefore, with the changes in power to the loads occurring faster than approximately 41 ms (which is the threshold at which changes and flickering is perceivable to the human eye), the frequency components all lie above 24 Hz (and may include, for example, components at 30 and 40 Hz).

Interpretation

It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Thus, one embodiment of each of the methods described herein is in the form of a computer-readable carrier medium carrying a set of instructions, e.g., a computer program that are for execution on one or more processors.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term "coupled", when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases “in one embodiment” or “in an embodiment” in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description. Although the invention has been described with reference to specific examples, it will be appreciated by those skilled in the art that the invention may be embodied in many other forms.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

We claim:

1. A kitchen appliance comprising:

a plurality of switched high power loads included in the kitchen appliance, each load being powered from a common alternating current power source;

a processor apparatus included in the kitchen appliance comprising:

(i) a memory having stored therein a lookup table; and (ii) a processor adapted to generate a plurality of switching signals for controlling the plurality of loads, wherein the plurality of switching signals are generated based on a respective switching sequence retrieved from the lookup table, wherein each switching sequence is indicative of selective activation of the plurality of loads over a sequence of half or full cycles of the common alternating current power source, wherein a combination of the plurality of switching signals has no frequency components less than 24 Hz or frequency components above 24 Hz have more energy than any frequency components below 24 Hz; and one or more zero crossing devices that are included in the kitchen appliance and that are electrically coupled with the plurality of loads and the processor apparatus, wherein the one or more zero crossing devices are configured to:

(i) receive the plurality of switching signals from the processor apparatus; and (ii) independently switch each load using a respective switching signal of the plurality of switching signals for zero crossing switching to achieve a desired average power output.

2. The kitchen appliance according to claim 1, wherein the plurality of loads are powered from the common alternating current power source operating at 60 Hz, wherein the plurality of loads are repeatedly switched according to the respective switching sequence in 5 or less half cycles of common alternating current power source.

3. The kitchen appliance according to claim 1, wherein the one or more zero crossing devices are configured to perform zero-crossing switching of the plurality of loads to achieve asymmetric power consumption between the plurality of loads.

4. The kitchen appliance according to claim 1, further comprising a temperature sensor electrically coupled with the processor apparatus, wherein the processor apparatus is configured to generate the plurality of switching signals based on a temperature feedback signal indicative of a current temperature of the plurality of loads received from the temperature sensor.

5. A method of generating one or more switching signals that control operation of a plurality of switched high power loads in a kitchen appliance, each load being powered from a common alternating current power source, wherein the method comprises:

generating, by a processor apparatus of the kitchen appliance, a plurality of switching signals for controlling the plurality of loads of the kitchen appliance, wherein the plurality of switching signals are generated based on a respective switching sequence retrieved from a lookup table stored in memory of the processor apparatus, wherein each switching sequence is indicative of a respective selective activation of the plurality of loads over a sequence of half or full cycles, wherein each switching sequence is indicative of a selective activation of the plurality of loads over a sequence of half or full cycles of the common alternating current power source, wherein a combination of the plurality of switching signals has no frequency components less than 24 Hz or frequency components above 24 Hz have more energy than any frequency components below 24 Hz; and receiving, from the processor apparatus by one or more zero crossing devices of the kitchen appliance in electrical communication with the plurality of loads, the plurality of switching signals; and independently switching, by the one or more zero crossing devices of the kitchen appliance, each load of the kitchen appliance using a respective switching signal of the plurality of switching signals for zero crossing switching to achieve a desired average power output.

6. The kitchen appliance according to claim 1, wherein the one or more zero crossing devices comprise of:

one or more zero crossing switches; or one or more zero crossing circuits.

7. The kitchen appliance according to claim 1, wherein the plurality of loads comprise of a plurality of heater devices.

8. The kitchen appliance according to claim 1, wherein the kitchen appliance is one of:

an oven; or a toaster.

9. The kitchen appliance according to claim 1, further comprising:

a temperature sensor to sense a temperature of the plurality of loads;

a temperature controller electrically coupled to the one or more zero crossing devices, the plurality of loads and the temperature sensor, wherein the temperature controller is configured to:

receive, from the temperature sensor, a temperature feedback signal indicative of a current temperature of the plurality of loads; and electrically connect or disconnect the one or more zero crossing devices and the plurality of loads based on a comparison of the current temperature with a temperature set point.

10. The kitchen appliance according to claim 9, wherein the temperature controller is configured to electrically connect the one or more zero crossing devices with the plurality of loads in response to the current temperature being below the temperature set point.

11. The kitchen appliance according to claim 9, wherein the temperature controller is configured to electrically disconnect the one or more zero crossing devices from the plurality of loads in response to the current temperature being above the temperature set point.

12. The kitchen appliance according to claim 9, wherein the temperature controller is configured to receive a signal indicative of the temperature set point.

13. The kitchen appliance according to claim 4, wherein the processor apparatus is configured to receive a temperature set point signal indicative of a temperature set point, wherein the processor apparatus is configured to generate the plurality of switching signals based on a comparison of the current temperature to the set point temperature.

14. The method according to claim 5, wherein the plurality of loads are powered from the common alternating current power source operating at 60 Hz, wherein the method includes repeatedly switching the plurality of loads according to the respective switching sequence in 5 or less half cycles of common alternating current power source.

15. The method according to claim 5, wherein the method includes the one or more zero crossing devices performing zero-crossing switching of the plurality of loads to achieve asymmetric power consumption between the plurality of loads.

16. The method according to claim 5, further comprising generating, by the processor apparatus of the kitchen appliance, the plurality of switching signals based on a temperature feedback signal indicative of a current temperature of the plurality of loads of the kitchen appliance received from a temperature sensor electrically coupled to the processor apparatus.

17. The method according to claim 5, wherein the kitchen appliance comprises a temperature sensor to sense a temperature of the plurality of loads, and a temperature controller electrically coupled to the one or more zero crossing devices, the plurality of loads and the temperature sensor, wherein the method includes:

receiving, at the temperature controller from the temperature sensor, a temperature feedback signal indicative of a current temperature of the plurality of loads; and electrically connect or disconnect the one or more zero crossing devices and the plurality of loads based on a comparison of the current temperature with a temperature set point.

18. The method according to claim 17, further comprising the temperature controller electrically connecting the one or more zero crossing devices with the plurality of loads in response to the current temperature being below the temperature set point.

19. The method according to claim 17, further comprising the temperature controller electrically disconnecting the one or more zero crossing devices from the plurality of loads in response to the current temperature being above the temperature set point.

20. The method according to claim 17, further comprising receiving, at the temperature controller, a signal indicative of the temperature set point.

21. The method according to claim 5, further comprising the processor apparatus receiving a temperature set point signal indicative of a temperature set point, wherein generating the plurality of switching signals is based on a comparison of the current temperature to the set point temperature.

* * * * *